United States Patent
Hake

(10) Patent No.: US 12,531,453 B2
(45) Date of Patent: Jan. 20, 2026

(54) E-MACHINE WITH A COOLING SYSTEM INCLUDING MANIFOLD MEMBER FOR SPRAY OF STATOR COOLING FLUID

(71) Applicant: Garrett Transportation I Inc., Torrance, CA (US)

(72) Inventor: Matthew Hake, Indianapolis, IN (US)

(73) Assignee: Garrett Transportation I Inc., Torrance, CA (US)

( * ) Notice: Subject to any disclaimer, the term of this patent is extended or adjusted under 35 U.S.C. 154(b) by 307 days.

(21) Appl. No.: 18/322,642

(22) Filed: May 24, 2023

(65) Prior Publication Data
US 2023/0421017 A1 Dec. 28, 2023

Related U.S. Application Data

(60) Provisional application No. 63/367,054, filed on Jun. 27, 2022.

(51) Int. Cl.
*H02K 9/19* (2006.01)
*H02K 5/20* (2006.01)

(52) U.S. Cl.
CPC .............. *H02K 5/203* (2021.01); *H02K 9/19* (2013.01)

(58) Field of Classification Search
CPC .................................. H02K 9/19; H02K 1/20
See application file for complete search history.

(56) References Cited

U.S. PATENT DOCUMENTS

| | | | |
|---|---|---|---|
| 5,682,074 A * | 10/1997 | Di Pietro | ........... B22D 19/0054 310/211 |
| 6,579,202 B2 | 6/2003 | El-Antably et al. | |
| 8,629,586 B2 | 1/2014 | Minemura et al. | |
| 2002/0077209 A1* | 6/2002 | El-Antably | ......... F16H 57/0412 903/910 |
| 2011/0156509 A1* | 6/2011 | Minemura | ............... H02K 9/19 310/54 |

(Continued)

FOREIGN PATENT DOCUMENTS

| CN | 113675966 A | 11/2021 |
|---|---|---|
| EP | 3886299 A1 | 9/2021 |

OTHER PUBLICATIONS

Gundabattini et al.; "Thermal Mapping of a High-Speed Electric Motor Used for Traction Applications and Analysis of Various Cooling Methods-A Review"; Energies; Mar. 2021; pp. 1-33.

*Primary Examiner* — Oluseye Iwarere
*Assistant Examiner* — Masoud Vaziri
(74) *Attorney, Agent, or Firm* — BelayIP

(57) ABSTRACT

An e-machine includes a housing with a cooling fluid inlet and a cooling fluid outlet. The e-machine includes a rotating group supported for rotation about an axis of rotation within the housing. The cooling fluid inlet and the cooling fluid outlet are disposed on opposite sides of the axis of rotation. The e-machine includes a stator disposed within the housing. The e-machine includes a plurality of nozzles in fluid communication with the cooling fluid inlet to receive a cooling fluid therefrom. The plurality of nozzles are arranged about the axis of rotation and generally toward the stator. The arrangement of the plurality of nozzles is directed generally in a circumferential direction with respect to the axis of rotation from the cooling fluid inlet to the cooling fluid outlet.

20 Claims, 4 Drawing Sheets

(56) References Cited

U.S. PATENT DOCUMENTS

| | | | | |
|---|---|---|---|---|
| 2014/0009015 | A1* | 1/2014 | Hossain | H02K 9/19 |
| | | | | 310/59 |
| 2021/0067006 | A1* | 3/2021 | Lee | H02K 3/50 |
| 2021/0234433 | A1* | 7/2021 | Kowitz | H02K 9/19 |
| 2021/0328480 | A1* | 10/2021 | Kosaka | H02K 1/148 |
| 2022/0205486 | A1* | 6/2022 | Ziskovsky | H02K 5/203 |
| 2022/0209618 | A1* | 6/2022 | Ziskovsky | H02K 9/19 |
| 2023/0107498 | A1* | 4/2023 | Leonardi | H02K 1/20 |
| | | | | 310/54 |
| 2023/0150683 | A1* | 5/2023 | Chong | H02K 9/197 |
| | | | | 244/53 R |
| 2024/0072603 | A1* | 2/2024 | Anghel | H02K 9/197 |
| 2024/0258870 | A1* | 8/2024 | Gramann | H02K 3/24 |
| 2024/0271693 | A1* | 8/2024 | Gassmann | F16H 57/045 |
| 2024/0271694 | A1* | 8/2024 | Gassmann | F16H 57/0413 |
| 2024/0388168 | A1* | 11/2024 | Ledieu | H02K 5/207 |

* cited by examiner

E-MACHINE WITH A COOLING SYSTEM INCLUDING MANIFOLD MEMBER FOR SPRAY OF STATOR COOLING FLUID

CROSS REFERENCE TO RELATED APPLICATION

The following claims priority to U.S. Provisional Patent Application Ser. No. 63/367,054, filed Jun. 27, 2022, the entire disclosure of which is incorporated by reference.

TECHNICAL FIELD

The present disclosure generally relates to an e-machine and, more particularly, relates to an e-machine with a cooling system including a manifold member for spray of a stator cooling fluid.

BACKGROUND

Various e-machines are provided for a number of purposes. For example, electric motors are provided for driving a shaft in rotation, electric generators are provided for converting shaft rotation into electric energy, and some e-machines are configured to operate in some conditions as a motor and in other conditions as a generator.

The e-machine may include a stator that generates significant heat during operation. Excessive thermal conditions may negatively affect the performance of the e-machine. For example, the thermal limits of the materials of the stator may limit the amount of power that may be produced by the e-machine.

Thus, in some cases, the e-machine may be configured with a cooling system. Various types of cooling systems are proposed for these purposes. However, conventional cooling systems of this type may have limited effectiveness, and performance may be limited as a result.

Accordingly, it is desirable to provide an improved cooling system for an e-machine. For example, it is desirable to provide an e-machine that effectively provides a cooling fluid to the stator. It is also desirable to provide such a cooling system wherein the cooling fluid circulates through the e-machine efficiently and effectively for improved operations. Moreover, it is desirable to provide such an e-machine, which may be manufactured and assembled in an efficient manner. Other desirable features and characteristics of the present disclosure will become apparent from the subsequent detailed description and the appended claims, taken in conjunction with the accompanying drawings and this background discussion.

BRIEF SUMMARY

An e-machine is disclosed that includes a housing with a cooling fluid inlet and a cooling fluid outlet. The e-machine further includes a rotating group supported for rotation about an axis of rotation within the housing. The cooling fluid inlet and the cooling fluid outlet are disposed on opposite sides of the axis of rotation. Also, the e-machine includes a stator disposed within the housing. Moreover, the e-machine includes a plurality of nozzles in fluid communication with the cooling fluid inlet to receive a cooling fluid therefrom, the plurality of nozzles in an arrangement about the axis of rotation and generally toward the stator, the arrangement of the plurality of nozzles directed generally in a circumferential direction with respect to the axis of rotation from the cooling fluid inlet to the cooling fluid outlet.

Furthermore, a method of manufacturing an e-machine is disclosed that includes providing a housing with a cooling fluid inlet and a cooling fluid outlet. The method further includes inserting a manifold member in the housing, the manifold member including a plurality of passages that end at respective ones of a plurality of nozzles, including fluidly connecting the cooling fluid inlet to the plurality of nozzles. The method also includes supporting a rotating group about an axis of rotation within the housing, the cooling fluid inlet and the cooling fluid outlet disposed on opposite sides of the axis of rotation. Additionally, the method includes providing a stator within the housing. The plurality of nozzles is in fluid communication with the cooling fluid inlet to receive a cooling fluid therefrom, the plurality of nozzles in an arrangement about the axis of rotation and generally toward the stator, the arrangement of the plurality of nozzles directed generally in a circumferential direction with respect to the axis of rotation from the cooling fluid inlet to the cooling fluid outlet.

Moreover, an electric motor is disclosed that includes a rotating group and a housing with a cooling oil fluid inlet and a cooling oil fluid outlet. The electric motor also includes a stator disposed within the housing, and the stator includes a plurality of winding end turns. The electric motor also includes a manifold member disposed within the housing and including a plurality of passages that terminate at respective nozzles ends. The plurality of passages is in fluid communication with the inlet to receive a cooling oil fluid therefrom. The nozzles ends are arranged in an arrangement about the axis of rotation and generally toward the plurality of winding end turns of the stator. The arrangement of the nozzles ends is directed generally in a circumferential direction with respect to the axis of rotation from the cooling oil fluid inlet to the cooling oil fluid outlet.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved e-machine, such as an electric motor or electric generator. The e-machine of the present disclosure may include a cooling system that provides a cooling fluid, such as coolant oil, to the stator of the e-machine. The cooling system may also include a plurality of outlets for the coolant oil (e.g., nozzles, sprayers, ports, etc.) that are disposed in a predetermined arrangement, for example, with respect to the axis of rotation of the e-machine. In some embodiments, nozzles may be included that spray the cooling fluid toward the stator of the e-machine. The nozzles may be configured to direct the cooling fluid toward the end turns of the stator. Additionally, in some embodiments, the e-machine may include a manifold member that includes, positions, and/or defines the arrangement of nozzles and that receives the cooling fluid from at least one inlet and that distributes the cooling fluid toward the end turns of the stator.

It is understood that the terms "nozzle," "sprayer," "port," and the like are to be interpreted broadly and to include a variety of configurations without departing from the scope of the present disclosure. There may be an aperture formed in (i.e., integrally included in) the manifold member that defines the "nozzle," "sprayer," "port," etc. The manifold member may include a plurality of these integrally-formed apertures, arranged in an arrangement about the axis of rotation of the e-machine. In additional embodiments, the manifold member may support a plurality of nozzles that are inserted or otherwise connected to a support structure of the manifold member. There may be a plurality of nozzles arranged in an arrangement about the axis of rotation.

Furthermore, in some embodiments, a nozzle arrangement may be included that is configured to direct the cooling fluid in a generally circumferential direction about the stator end turns with respect to the axis of rotation of the e-machine rotor. Angled spray nozzles may be included, encouraging circumferential flow around the windings and toward a gravity drain. With the system "fresh" and "cool" cooling fluid may be directed at multiple angular positions around the circumference of the stator end turns to ensure that all or nearly all locations receive a cooling effect. As such, the cooling fluid may be effectively and efficiently delivered to the end turns of the stator and generally toward a cooling fluid outlet. The features of the present disclosure may help reduce/eliminate misting evaporation, coking, and/or deposit formation, which may otherwise cause cooling degradation.

Figure 1:
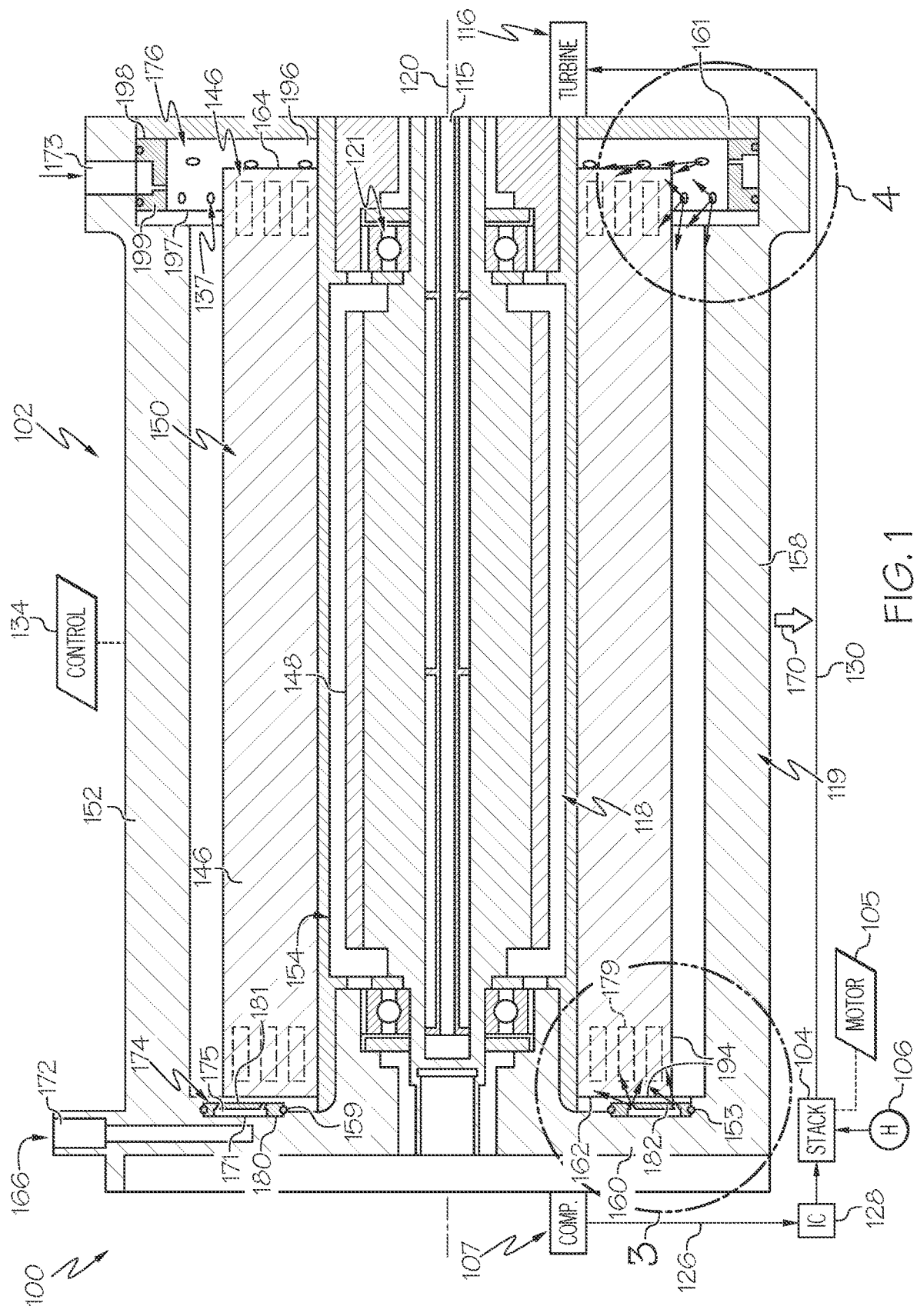
FIG. 1 is a cross-sectional view of an e-machine shown schematically within an engine system according to example embodiments of the present disclosure.

FIG. 1 is a schematic view of a fuel cell system 100 with an example turbomachine 102 of the present disclosure. In some embodiments, the fuel cell system 100 may be included in a vehicle, such as a car, truck, sport utility vehicle, van, motorcycle, etc. However, it will be appreciated that the fuel cell system 100 may be configured for a different use without departing from the scope of the present disclosure.

The fuel cell system 100 may include a fuel cell stack 104 containing a plurality of fuel cells. Hydrogen may be supplied to the fuel cell stack 104 from a tank 106, and oxygen may be supplied to the fuel cell stack 104 to generate electricity by a known chemical reaction. The fuel cell stack 104 may generate electricity for an electrical device, such as an electric motor 105. As stated, the fuel cell system 100 may be included in a vehicle; therefore, in some embodiments, the electric motor 105 may convert the electrical power to mechanical power to drive and rotate an axle (and, thus, one or more wheels) of the vehicle.

Oxygen may be provided to the fuel cell stack 104, at least in part, by the turbomachine 102. As will be discussed, the turbomachine 102 may compress air as it flows toward the fuel cell stack 104 for boosting the operating efficiency of the fuel cell system 100.

For example, the turbomachine 102 may be configured as a turbocharger with a compressor stage 107 and a turbine stage 116 (both shown schematically). As shown in FIG. 1, the turbomachine 102 may generally include a rotating group 118 and a housing 119. The rotating group 118 may include a shaft 115 that is supported for rotation about an axis 120 within the housing 119 by a bearing system 121. The bearing system 121 may have a variety of configurations. For example, the bearing system 121 may include one or more rolling element bearings. In additional embodiments, the bearing system 121 may include a plain bearing, an air bearing, and/or an oil-less bearing. The compressor stage 107 may include a compressor wheel that is mounted on the shaft 115 and that is supported within a portion of the housing 119 (i.e., within a compressor housing). Likewise, the turbine stage 116 may include a turbine wheel that is mounted on the shaft 115 and that is supported within a portion of the housing 119 (i.e., within a turbine housing). The shaft 115 may operably couple the wheels of the compressor stage 107 and the turbine stage 116 such that they rotate as a unit (i.e., to collectively define the rotating group 118).

Furthermore, in some embodiments, the turbomachine 102 may be equipped with an e-machine, such as an electric motor 150. The electric motor 150 may be configured as a radial-type electric motor. In additional embodiments, the e-machine may be an electric generator or a combination motor/generator that operates as a motor in some conditions and alternatively as a generator in other conditions. The electric motor 150 may include a stator 146 and a rotor 148. The stator 146 may be supported within the housing 119, and the rotor 148 may be operably attached to the shaft 115 to define part of the rotating group 118. During operation, the motor 150 may drive the rotating group 118 in rotation about an axis 120.

During operation of the turbomachine 102, the compressor stage 107 may receive an inlet airstream, which the compressor stage 107 compresses into to a high pressure airstream 126 that is directed, for example, to an intercooler 128 and then to the fuel cell stack 104. Accordingly, the stack 104 may generate electricity from the hydrogen provided from the tank 106 and the oxygen provided by the high pressure airstream 126.

Moreover, an exhaust gas stream (represented by arrow 130) from the fuel cell stack 104 may be directed back to the turbine stage 116 of the turbomachine 102. The exhaust gas stream 130 may drive and rotate the rotating group 118 at the turbine stage 116 to assist the motor section 112.

Various components of the fuel cell system 100 may be controlled by a control system 134. The control system 134 may be a computerized system with a processor, various sensors, and other components for electrically controlling operation of the fuel cell stack 104, the motor 150, and/or other features of the system 100. In some embodiments, the control system 134 may define or may be part of the electrical control unit (ECU) of a vehicle.

It will be appreciated that the turbomachine 102 could have a different configuration from the turbocharger illustrated in FIG. 1 without departing from the scope of the present disclosure. For example, the turbomachine 102 may be configured as an electric motor assisted fluid compressor (i.e., a turbine-less fluid compressor) in some embodiments. Furthermore, the turbomachine 102 of the present disclosure may be incorporated into a number of systems other than a fuel cell system without departing from the scope of the present disclosure. For example, the turbomachine 102 of the present disclosure may be incorporated within an internal combustion engine system for compressing air that is fed to an internal combustion engine, or the turbomachine 102 may be incorporated within another system without departing from the scope of the present disclosure. Furthermore, the electric motor 150 may be incorporated in or otherwise operably connected to another machine other than a turbomachine without departing from the scope of the present disclosure. Also, the electric motor 150 of the present disclosure may be configured for an electric vehicle traction drive system wherein the electric motor 150 is operable to drive rotation of the shaft 115, and the shaft 115 is operatively connected to a transmission for transferring power to an axle of the vehicle.

Figure 2:
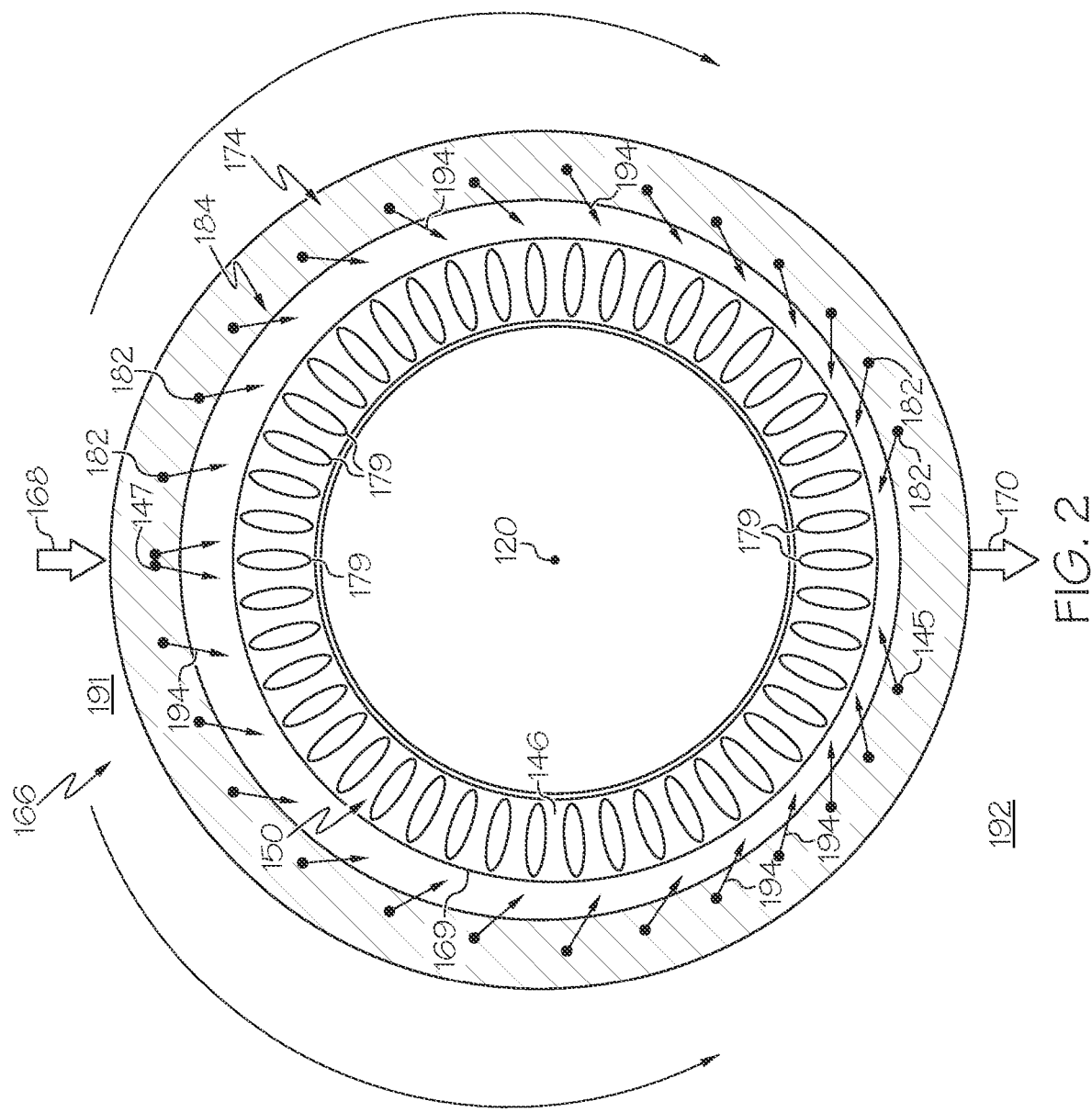
FIG. 2 is a schematic end view of the e-machine of FIG. 1 according to example embodiments of the present disclosure.

Referring now to FIGS. 1-2, additional features of the electric motor 150 will be discussed. As shown, the housing 119 may include a motor housing 152. The motor housing 152 may be a hollow member defined by two or more parts that are attached together to collectively define a motor cavity 154 therein. The cavity 154 may be cylindrical and substantially centered on the axis of rotation 120. The cavity 154 may be defined by at least one outer radial wall member 158 and a first axial end wall 160. The outer radial wall member 158 may cover over outer radial surface(s) of the motor 150, and the first axial end wall 160 may cover over a first axial end 162 of the motor 150. In some embodiments, the compressor stage 107 and the motor 150 may be disposed on opposite axial sides of the first axial end wall 160. The motor housing 152 may also include a second axial end wall 161. The second axial end wall 161 may be a flat disc-shaped member that is attached to the outer radial wall member 158 on an axial end opposite to the first axial end wall 160. The second axial end wall 161 may cover over the open end of the outer radial wall member 158 and may cover over a second axial end 164 of the motor 150. The second axial end wall 161 may be disposed axially between the motor 150 and the turbine stage 116 and may separate the motor 150 from the turbine stage 116.

The shaft 115 may extend through the motor cavity 154. The rotor 148 may be mounted on the shaft 115 within the motor cavity 154. The stator 146 may be supported within the motor cavity 154 and may surround the rotor 148.

The electric motor 150 may further include at least one cooling system 166, which is schematically illustrated in FIG. 2 according to example embodiments. The cooling system 166 may be configured for removing heat from the motor 150. The cooling system 166 may include at least one fluid inlet 168 and at least one fluid outlet 170. In some embodiments represented in FIG. 1, the cooling system 166 may include a first fluid inlet 172 and a second fluid inlet 173 as well as the fluid outlet 170.

As shown in the embodiments illustrated in FIG. 1, the first fluid inlet 172 may extend through the first axial end wall 160. In some embodiments, the first fluid inlet 172 may extend radially along an axis that is substantially normal to the axis of rotation 120. The first fluid inlet 172 may extend through the axial end wall 160 radially to be disposed along the first axial end 162 of the motor 150. In some embodiments, the first fluid inlet 172 may be formed by removing material (e.g. by cutting material) from the axial end wall 160. The first fluid inlet 172 may be a drilled hole formed via a drilling process.

The second fluid inlet 173 may extend through the outer radial wall member 158. In some embodiments, the second fluid inlet 173 may extend along a radial axis that is substantially normal to the axis of rotation 120. The second fluid inlet 173 may extend through the outer radial wall member 158 and may radially extend toward the second axial end 164 of the motor 150. In some embodiments, the second fluid inlet 173 may be formed by removing material (e.g. by cutting material) from the outer radial wall member 158. The second fluid inlet 173 may be a drilled hole formed via a drilling process.

Thus, the first and second fluid inlets 172, 173 may be radially spaced apart along the axis 120. It will be appreciated that the first and second fluid inlets 172, 173 may extend through the housing 119 in another direction other than radially. At least one of the inlets 172, 173 may extend axially through the housing 119. The inlets 172, 173 may extend at a bias angle relative to the axis 120 and through the housing 119. Moreover, in some embodiments, the cooling fluid provided to the inlets 172, 173 and/or circulating through the cooling system 166 may be shared amongst connected components (e.g., a gearbox in fluid communication with the cooling system 166 of the motor 150).

The fluid outlet 170 may extend through the outer radial wall member 158. In some embodiments, the fluid outlet 170 may be axially disposed at a generally central location with respect to the first and second axial ends 162, 164 of the motor 150. The fluid outlet 170 may also extend along an axis that is substantially normal to the axis of rotation 120. The fluid outlet 170 may be a hole that is formed via a casting process, via a drilling process, or otherwise. The first and second fluid inlets 172, 173 may be disposed on a side of the axis 120 that is opposite the fluid outlet 170. The outlet 170 may be disposed below the inlets 172, 173 with respect to a direction of gravity for gravity-assisted flow of the cooling fluid. The inlets 172, 173 may be disposed on opposing sides horizontally (i.e., on left and right sides of the axis 120), and the outlet 170 may be disposed below the inlets 172, 173 with respect to the direction of gravity. Accordingly, as will be discussed, the cooling fluid may flow (i.e., drain) in a circumferential direction about the ends 162, 164 of the electric motor 150. The cooling fluid may be provided onto the stator 146 in a predetermined direction, and gravity may assist in directing flow of the cooling fluid from the inlet 172, 173 to the outlet 170. Thus, the cooling system 166 may provide highly efficient and effective cooling.

The electric motor 150 may additionally include at least one manifold member, such as a first manifold member 174 disposed proximate the first axial end 162 and a second manifold member 176 disposed proximate the second axial end 164 of the motor 150. The first manifold member 174 may be disposed proximate stator winding end turns 179 (shown schematically in FIG. 1) at the first axial end 162. The second manifold member 176 may be disposed proximate stator winding end turns 179 (shown schematically in FIG. 3) at the second axial end 164 of the motor 150.

The first manifold member 174 and/or the second manifold member 176 may be arcuate. In some embodiments, the first and/or second manifold members 174, 176 may extend annularly and substantially continuously about the axis 120. The manifold member(s) 174, 176 may include at least one internal fluid passage that includes one or more fluid branches for distributing the cooling fluid.

Figure 3:
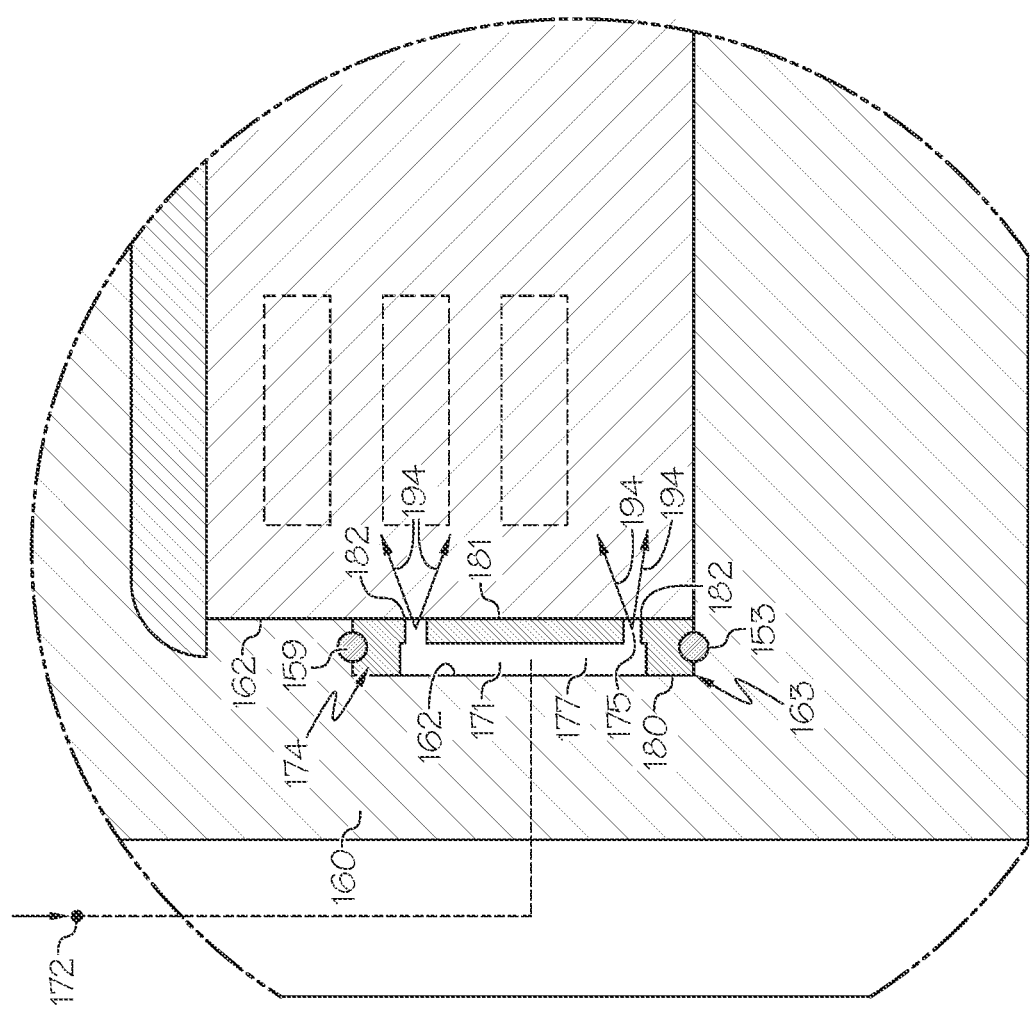
FIG. 3 is a detail of the cross-sectional view of a first manifold member of the e-machine of FIG. 1.

In some embodiments represented in FIGS. 1 and 3, the first manifold member 174 may be an annular, flat ring with an axial face 180 that faces outward axially from the first axial end 162. The axial face 180 may include one or more recesses 171 in fluid communication with the first fluid inlet 172. For example, the axial face 180 may include an annular recess 171 thereon that is centered on the axis 182. The first manifold member 174 may also include a plurality of passages 175 (e.g., through-holes) that extend from the recess 171 in the axial face 180, toward an opposite axial face 181 of the first manifold member 174.

As shown in FIG. 1, the first manifold member 174 may be included in the housing 119 between the end wall 160 and the first axial end 162 of the motor 150. The first manifold member 174 may be disposed in a pocket 163 that is defined in the end wall 160. The recess 171 may cooperate with an opposing wall of the pocket 163 to define a fluid receptacle 177 that is annular and that is centered on the axis 120. In some embodiments, an inner seal 159 (e.g., an O-ring) may be included at an inner diameter of the first manifold member 174 and the opposing surface of the pocket 163. A similar outer seal 153 may be included at an outer diameter of the first manifold member 174 to substantially seal to the opposing surfaces of the pocket 163 in the end wall 160.

The passages 175 may extend through first manifold member 174 and may terminate at respective nozzles 182 disposed at the axial face 181. In some embodiments, the passages 175 may be through-holes extending from the aperture 171 to the axial face 181. The nozzles 182 may be openings, apertures, etc. formed on the axial face 181. In other words, the passages 175 and the nozzles 182 may be integrally formed in the first manifold member 174. In other words, the nozzles 182 may be included on inserted nozzle members that are inserted and in fluid communication with the passages 175. The nozzles 182 of the passages 175 may be fluidly connected to the inlet 172 via the receptacle 177, and the passages 175 may extend (e.g., branch) therefrom to provide and distribute the cooling fluid to the plurality of nozzles 182.

The passages 175 may extend along any suitable direction. At least some of the passages 175 may extend axially (i.e., substantially parallel to the axis 120) as shown in FIG. 3. At least part of at least one passage 175 may extend arcuately about the axis of rotation 120 through the manifold member 174. At least one passage 175 may extend tangentially with respect to an imaginary circle centered on the axis 120. The axial face 181 may face inward toward the winding end turns 179 of the stator 146. The passages 175 may terminate at or proximate the axial face 181 at respective ones of the plurality of nozzles 182 (i.e., nozzle ends, ports, sprayer ends, etc.).

The nozzles 182 may be directed along the same axis as its respective passage 175. Thus, some nozzles 182 may direct spray axially, some may spray circumferentially, some may spray tangentially, and/or some nozzles 182 may spray radially. At least some of the nozzles 182 may be directed and oriented generally toward the end turns of the stator of the motor 150. The orientation/direction of the nozzles 182 may also be directed to promote flow of the coolant from the inlets 172, 173 to the outlet 170.

In some embodiments represented in FIGS. 1-3, the plurality of nozzles 182 may be arranged in an arrangement 184 about the axis of rotation 120 and directed for spraying the cooling fluid generally toward the stator 146. The arrangement 184 may include a first group of the plurality of nozzles 182 disposed on a first side 191 (e.g., a top side) of the axis of rotation 120 and a second group of the plurality of nozzles 182 disposed on a second, opposite side 192 (e.g., a bottom side) of the axis of rotation 120. The first side 191 may be disposed above the second side 192 with respect to the vertical direction (i.e., the direction of gravity). The cooling fluid outlet 170 may be disposed on the second side 192 for gravity-assisted flow of the cooling fluid toward the outlet 170.

The arrows 194 of FIGS. 1-3 may indicate the direction of the respective ones of the plurality of nozzles 182 in the arrangement 184. As shown, at least some of the plurality of nozzles 182 may be directed radially (FIG. 2) with respect to the axis 120. At least some of the nozzles 182 may directed tangentially (FIG. 2) with respect to an imaginary circle 169 that is substantially centered on the axis 120. At least some of the plurality of nozzles 182 may be directed axially (FIGS. 1 and 3) with respect to the axis 120. At least one of the nozzles 182 may be directed in at least two of the radial, tangential, and axial directions with respect to the axis 120. At least one of the nozzles 182 may be oriented toward the stator 146 to direct its spray radially, tangentially, and axially.

As shown in FIG. 2, the circle 169 may be defined, for example, by the plurality of end turns 179 of the stator 146. The circle 169 may also be referred to as an "end winding outer diameter boundary." Due to the arrangement 184, the nozzles 182 may collectively spray the cooling fluid over the end turns 179 of the stator 146. The nozzles 182 may spray in any suitable profile, spray shape, etc. For example, the nozzles 182 may provide a fan spray profile that fans outward as the spray moves away from the respective nozzle 182. Together, the spray profiles of the nozzles 182 may collectively span about a majority of the circumference of the circle 169. The spray provided by the nozzles 182 may, in some embodiments cover an entirety of the circumference of the circle 169 such that the combination of sprays covers the entire circumference of the end turns 179 within the circle 169.

As shown in FIG. 2, the nozzles 182 on the first side 191 of the axis 120 (i.e., above the axis 120) may be directed generally radially and/or tangentially to the circle 169 such that the cooling fluid may be sprayed generally downward and circumferentially around the stator 146. At least one top nozzle 147 may direct cooling fluid radially downward toward the top-most end turns 179 while other nozzles 147 may direct the fluid more tangentially with respect to the circle 169. The nozzles 182 on the second side 192 (i.e., below the axis 120) may be directed generally tangentially to the circle 169 to be delivered generally toward an underside of the stator 146. At least one bottom nozzle 145 may be directed tangentially toward the circle 169 and upward toward the bottom-most end turns 179.

Thus, the plurality of nozzles 182 may be directed collectively in a circumferential direction with respect to the circle 169 and to the axis of rotation 120, generally in a direction from the cooling fluid inlet 172 to the cooling fluid outlet 170 as represented in FIG. 2. Accordingly, cooling fluid may flow efficiently and may effectively remove heat from the end turns of the stator 146.

The second manifold member 176 may have similar and corresponding features to those of the first manifold member 174. Thus, the discussion above of the first manifold member may apply to corresponding features of the second manifold member 176.

Figure 4:
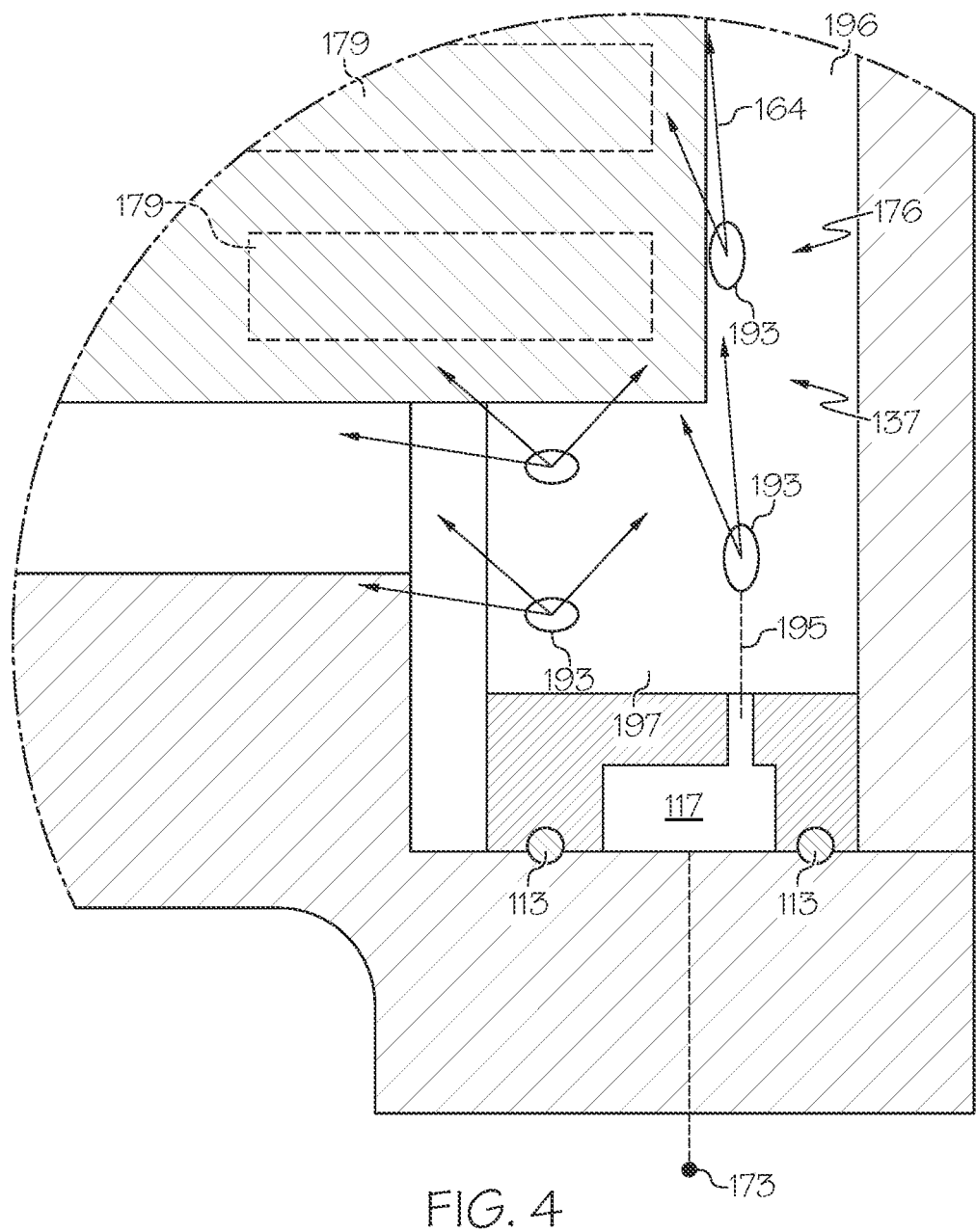
FIG. 4 is a detail of the cross-sectional view of a second manifold member of the e-machine of FIG. 1.

As shown in FIGS. 1 and 4, the second manifold member 176 may comprise one or more arcuate (e.g., annular) parts. The second manifold member 176 may include an end member 196 that covers over the second axial end 164 of the motor 150, and the second manifold member 176 may include an outer portion 197 that radially covers the stator 146 at the second axial end 164. The end member 196 and outer portion 197 may be attached so as to define an L-shaped axial cross section as shown in FIGS. 1 and 4. The second manifold member 176 may also include one or more collar members 198, 199. In some embodiments, the end member 196 and the outer portion 197 may be unitary and monolithic and disposed in the motor cavity 154 over the second axial end 164 of the motor 150. The collar members 198, 199 may be disposed outward radially within a gap between the outer portion 197 and the outer radial wall member 158. An annular fluid chamber 117 may be defined between the collar members 198, 199. The collar members 198, 199 may be sealed via O-ring seals 113 to the outer radial wall member 158 on opposite axial sides of the fluid chamber 117 and the inlet 173 as shown in FIG. 4.

The second manifold member 176 may also include a plurality of internal passages 195. The passages 195 may extend from the fluid chamber 117 and through the end member 196 and outer portion 197. The passages 195 may extend therethrough and may be in fluid communication with the second fluid inlet 173 via the fluid chamber 117. The passages 195 may end or terminate in respective nozzles 193. The plurality of nozzles 193 may be disposed within a predetermined arrangement 137 with respect to the axis of rotation 120, with respect to the end turns of the stator 146 at the second axial end 164, etc. The arrangement 137 may be similar to the arrangement 194 of the first manifold member 174 in some embodiments (e.g., the arrangement shown in FIG. 2). The passages 195 may extend along any suitable direction. At least some of the passages 195 may extend axially (i.e., substantially parallel to the axis 120) as shown in FIG. 4. At least part of at least one passage 195 may extend arcuately about the axis of rotation 120 through the manifold member 176 (e.g., circumferentially and/or tangentially).

During operation, the cooling system 166 may be configured for delivering (e.g., spraying, projecting, etc.) a cooling fluid onto the end turns 179 at the axial ends 162, 164 of the stator 146. Cooling fluid (e.g., oil or other liquid coolant) may be delivered via the inlets 172, 173 to the first and second manifold members 174, 176, respectively. The nozzles 182, 193 may provide an atomized spray of cooling fluid to the end turns 179 of the windings of the stator 146. The nozzles 182, 193 may provide a spray that substantially covers and coats the end turns 179 (i.e., end windings). The cooling fluid may move from the stator 146 and flow toward the outlet 170, thereby convectively removing heat from the motor 150. Accordingly, the motor 150 may operate at high efficiency.

It will be appreciated that the electric motor 150 may be manufactured efficiently and at relatively low cost. The motor 150 may also be relatively compact and lightweight, and the motor 150 may have a relatively low part count. The first and second manifold members 174, 176 may be formed via a casting method in some embodiments. In other embodiments the first and second manifold members 174, 176 may be formed via an additive manufacturing process (e.g., 3-D printing, etc.). In some embodiments, the nozzles 182, 193 may defined by holes that are drilled into the manifold members 174, 176 to provide the desired spray profile (e.g., jet or fan profile). In additional embodiments, one or more of the nozzles 182, 193 may include an insert that is received in the respective manifold member 174, 176 to provide the desired spray profile. The housing 119, the motor 150, the rotating group 118, etc. may be formed via conventional methods. The manifold members 174, 176 may be inserted and provided in the housing 119 as discussed above. Accordingly, the cooling system 166 may be provided using efficient manufacturing techniques.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. An e-machine comprising:
   a housing with a cooling fluid inlet and a cooling fluid outlet;
   a rotating group supported for rotation about an axis of rotation within the housing, the cooling fluid inlet and the cooling fluid outlet disposed on opposite sides of the axis of rotation,
   a stator disposed within the housing; and
   a plurality of nozzles disposed about the axis of rotation and respectively defining a radial axis extending normal to the axis of rotation between the respective one of the plurality of nozzles and the axis of rotation, the plurality of nozzles in fluid communication with the cooling fluid inlet to receive a cooling fluid therefrom, the plurality of nozzles in an arrangement about the axis of rotation and generally toward the stator, the plurality of nozzles respectively oriented at an offset angle that is greater than zero relative to the respective radial axis, the offset angle gradually changing about the axis of rotation in the arrangement to provide flow of the cooling fluid from the arrangement toward the stator generally in a circumferential direction with respect to the axis of rotation.

2. The e-machine of claim 1, further comprising a manifold member that is included in the housing, the manifold member including a plurality of passages that fluidly connect the cooling fluid inlet to the plurality of nozzles to distribute the cooling fluid from the cooling fluid inlet to the plurality of nozzles.

3. The e-machine of claim 2, wherein the manifold member is annular and extends circumferentially about the axis of rotation.

4. The e-machine of claim 2, wherein the cooling fluid inlet extends radially through the housing and substantially normal to the axis of rotation; and
   wherein the plurality of passages includes at least one passage that extends arcuately about the axis of rotation.

5. The e-machine of claim 2, wherein the cooling fluid inlet extends through the housing to fluidly connect to the plurality of passages via a recess on the manifold member.

6. The e-machine of claim 1, wherein the arrangement includes a first group of the plurality of nozzles disposed on a first side of the axis of rotation and a second group of the plurality of nozzles disposed on a second side of the axis of rotation, the first side being opposite to the second side.

7. The e-machine of claim 1, wherein at least one of the plurality of nozzles is oriented radially with respect to the axis of rotation.

8. The e-machine of claim 1, wherein at least one of the plurality of nozzles is oriented tangentially with respect to an imaginary circle that is centered on the axis of rotation.

9. The e-machine of claim 8, wherein the imaginary circle is defined by a plurality of end turns of the stator.

10. The e-machine of claim 1, wherein at least one of the plurality of nozzles is oriented axially with respect to the axis of rotation.

11. The e-machine of claim 1, wherein the cooling fluid outlet is disposed below the cooling fluid inlet with respect to a direction of gravity for gravity-assisted flow of the cooling fluid.

12. The e-machine of claim 1, wherein the e-machine is an electric motor, and the stator is a motor stator.

13. A method of manufacturing an e-machine comprising:
providing a housing with a cooling fluid inlet and a cooling fluid outlet;
inserting a manifold member in the housing, the manifold member including a plurality of passages that end at respective ones of a plurality of nozzles, including fluidly connecting the cooling fluid inlet to the plurality of nozzles;
supporting a rotating group about an axis of rotation within the housing, the cooling fluid inlet and the cooling fluid outlet disposed on opposite sides of the axis of rotation;
providing a stator within the housing; and
the plurality of nozzles disposed about the axis of rotation and respectively defining a radial axis extending normal to the axis of rotation between the respective one of the plurality of nozzles and the axis of rotation, the plurality of nozzles in fluid communication with the cooling fluid inlet to receive a cooling fluid therefrom, the plurality of nozzles in an arrangement about the axis of rotation and generally toward the stator, the plurality of nozzles respectively oriented at an offset angle that is greater than zero relative to the respective radial axis, the offset angle gradually changing about the axis of rotation in the arrangement to provide flow of the cooling fluid from the arrangement toward the stator generally in a circumferential direction with respect to the axis of rotation.

14. The method of claim 13, wherein the manifold member is annular and extends circumferentially about the axis of rotation.

15. The method of claim 13, wherein the cooling fluid inlet extends radially through the housing and substantially normal to the axis of rotation; and
wherein the plurality of passages includes at least one passage that extends arcuately about the axis of rotation.

16. The method of claim 13, wherein the cooling fluid inlet extends through the housing to fluidly connect to the plurality of passages via a recess on the manifold member.

17. The method of claim 13, wherein the arrangement includes a first group of the plurality of nozzles disposed on a first side of the axis of rotation and a second group of the plurality of nozzles disposed on a second side of the axis of rotation, the first side being opposite to the second side.

18. The method of claim 13, wherein at least one of the plurality of nozzles is oriented tangentially with respect to an imaginary circle that is centered on the axis of rotation.

19. The method of claim 18, wherein the imaginary circle is defined by a plurality of end turns of the stator.

20. An electric motor comprising:
a rotating group supported for rotation about an axis of rotation;
a housing with a cooling fluid inlet and a cooling fluid outlet;
a stator disposed within the housing, the stator including a plurality of winding end turns;
a manifold member disposed within the housing and including a plurality of passages that terminate at respective ones of a plurality of nozzles, the plurality of nozzles disposed about the axis of rotation and respectively defining a radial axis extending normal to the axis of rotation between the respective one of the plurality of nozzles and the axis of rotation, the plurality of passages in fluid communication with the inlet to receive a cooling fluid therefrom, the plurality of nozzles arranged in an arrangement about the axis of rotation and generally toward the plurality of winding end turns of the stator, the plurality of nozzles respectively oriented at an offset angle that is greater than zero relative to the respective radial axis, the offset angle gradually changing about the axis of rotation in the arrangement to provide flow of the cooling fluid generally in a circumferential direction with respect to the axis of rotation.

\* \* \* \* \*